United States Patent

[11] 3,574,362

| [72] | Inventors | Eric Gregg |
| | | Divernon; |
| | | Robert E. Hunter, Virden, Ill. |
| [21] | Appl. No. | 816,899 |
| [22] | Filed | Apr. 17, 1969 |
| [45] | Patented | Apr. 13, 1971 |
| [73] | Assignee | Stewart-Warner Corporation |
| | | Chicago, Ill. |

[54] VACUUM SYSTEM COUPLING
1 Claim, 12 Drawing Figs.

[52] U.S. Cl. .................................................. 285/321,
285/423
[51] Int. Cl. ................................................... F16l 39/00
[50] Field of Search .......................................... 285/305,
321, 423; 85/8.8; 24/217

[56] References Cited
UNITED STATES PATENTS

| 2,748,715 | 6/1956 | Mamu | 285/321X |
| 2,952,480 | 9/1960 | Prill et al. | 285/321X |
| 3,314,696 | 4/1967 | Ferguson et al. | 285/305X |

Primary Examiner—Dave W. Arola
Attorneys—Augustus G. Douvas, William J. Newman and Norton Lesser ABSTRACT: The following specification describes plastic coupling and check valve assemblies in which the rim of a rubber check valve is held under compression between two plastic coupling elements which are then welded to thereafter hold the rim under compression against leakage. An improved check valve utilizing either a moulded circular edge or a conical sealing surface is described and, in addition, a quick connect coupling assembly in which a spring clip located in one coupling element automatically locks a second element thereto on insertion of the second element in the one element is also described.

INVENTORS
Eric Gregg
Robert E. Hunter

By Norton Lesser
Attorney

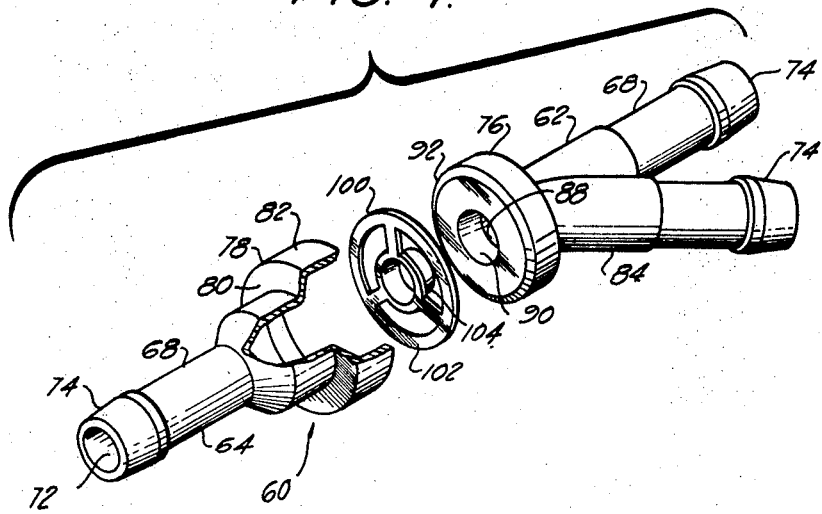
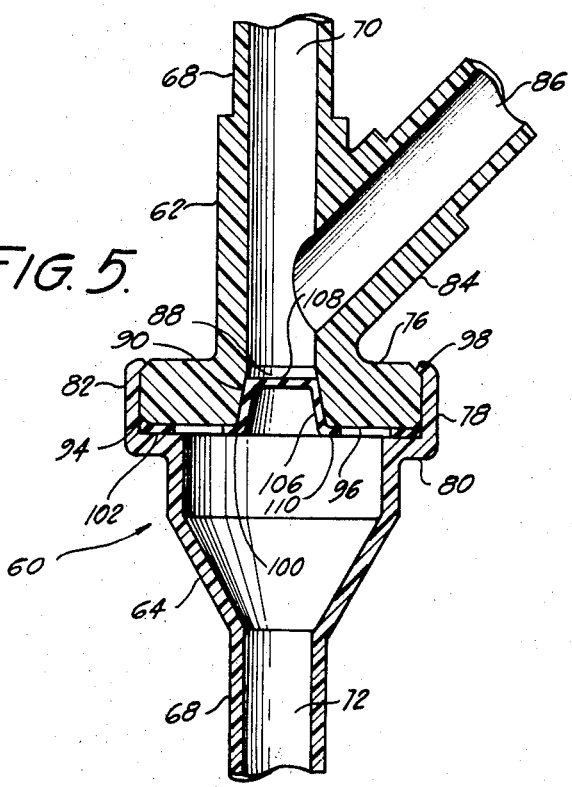
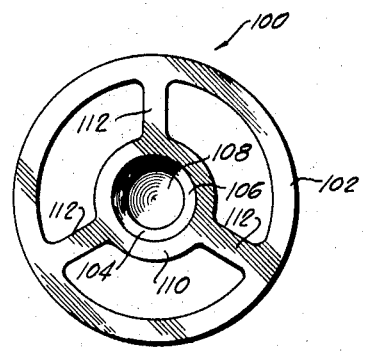
INVENTORS
Eric Gregg
Robert E. Hunter
By Norton Lesser
Attorney

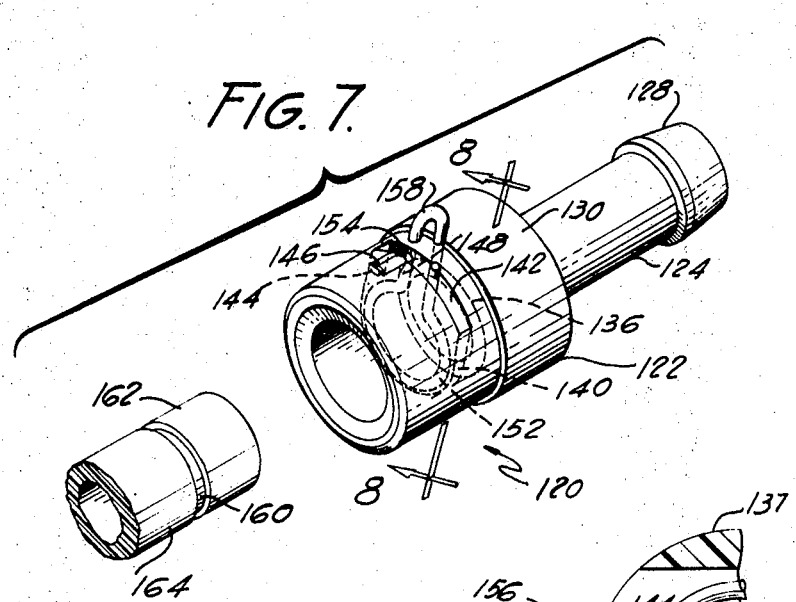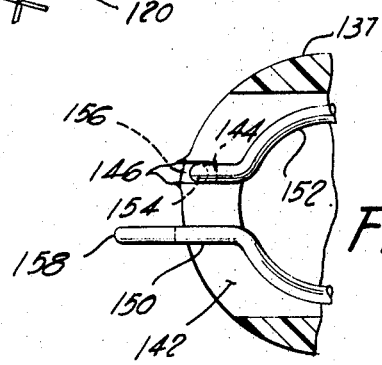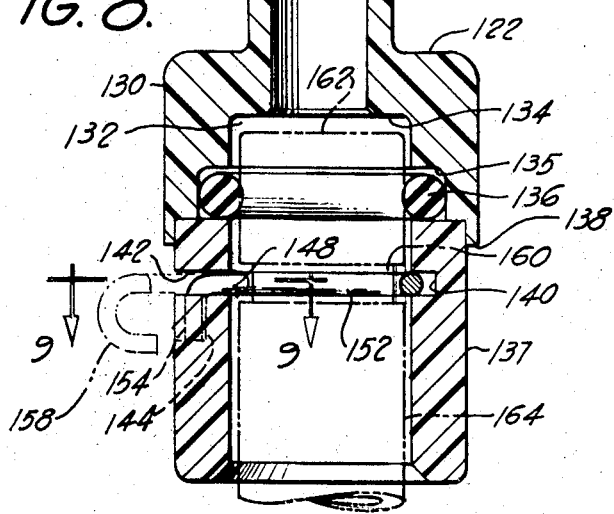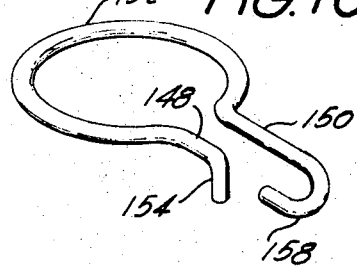

PATENTED APR 13 1971

INVENTORS
Eric Gregg
Robert E. Hunter

By Norton Lesser
ATTORNEY

VACUUM SYSTEM COUPLING

BACKGROUND OF THE INVENTION

1. Field of the Invention

The present invention relates in general to vacuum system couplings and valves and more particularly to plastic couplings and check valves therefor which are economically fabricated for facile installation in vehicular type vacuum or vapor emission systems.

2. Description of the Prior Art

Vacuum systems or vapor emission control systems are commonly coming into use for respectively controlling various vehicle apparatus and/or for controlling gas or other vapor emissions. Among the primary requirements of such systems are that the check valve arrangements be economical and secure against leakage and when field installed, the minimum of labor is required to effectuate connections.

Generally molded couplings are used in such installations with check valves comprising simple rubber flaps being used therebetween for controlling the direction of airflow. These valves have been subject to leakage unless fabricated with extreme care and in addition both valve function and connecting apparatus have been relatively ineffective or expensive.

SUMMARY OF THE INVENTION

Basically, in one solution provided by the invention, the rim of a rubber check valve is held under compression between two plastic coupling elements which are then ultrasonically welded to ensure that the valve rim is held properly sealed thereafter. Either a circular sealing edge is molded on one coupling for engaging the rubber check valve or the check valve is formed with a conical sealing surface for seating against a similarly shaped passageway surface to provide a large area subject to radial air pressure for sealing the valve surface or a ring of deformable material is sandwiched between the valve and an adjacent wall to seal the surfaces.

For facile field installation a simple split annular or ring spring clip is carried by one coupling for first expanding to receive a second coupling and then contracting behind a shoulder on the second coupling to retain the second coupling in sealing engagement with an O-ring carried by the first coupling. There is thus provided a family of couplings carrying check valves and/or capable of facile engagement with other couplings in vehicle vacuum or vapor emission control system.

Other objects and features of the present invention will become apparent on examination of the following specification and claims together with the drawings.

DESCRIPTION OF THE DRAWINGS

FIG. 4 is an exploded isometric view of another coupling assembly employing a branched coupling and a check valve of improved design;

FIG. 5 is a sectional view of the coupling assembly shown in FIG. 4;

FIG. 6 is a front elevational view of the check valve shown in FIGS. 4 and 5;

FIG. 7 is an isometric view of a quick connect and disconnect coupling assembly;

FIG. 8 is a sectional view of the coupling assembly taken along the line 8—8 in FIG. 7;

FIG. 9 is a fragmentary sectional view taken along the line 9—9 in FIG. 8;

FIG. 10 is an isometric view of the spring clip shown in FIGS. 7 and 8;

DESCRIPTION OF THE PREFERRED EMBODIMENTS

Figure 1:
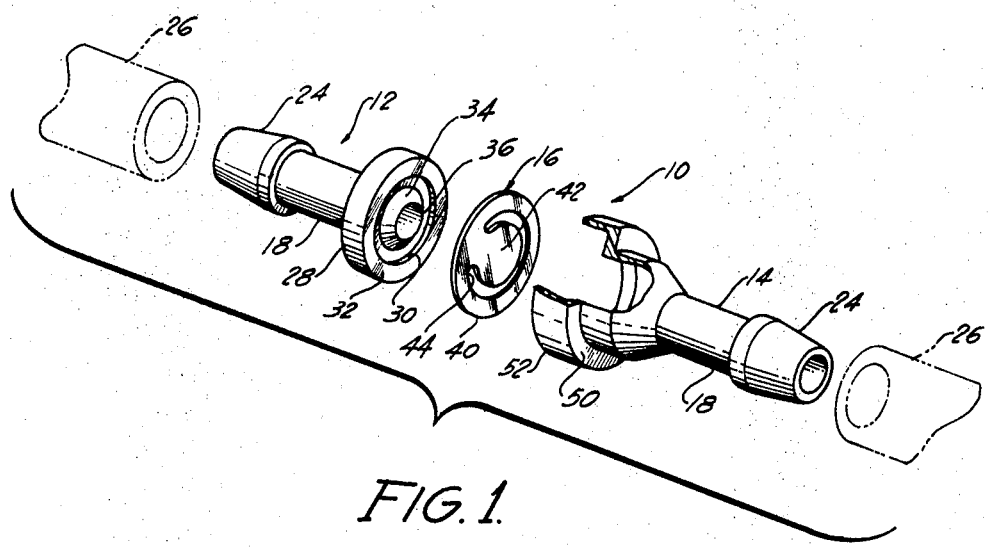
FIG. 1 is an exploded isometric view of one coupling assembly employing the principles of the present invention.
Figures 2, 3:
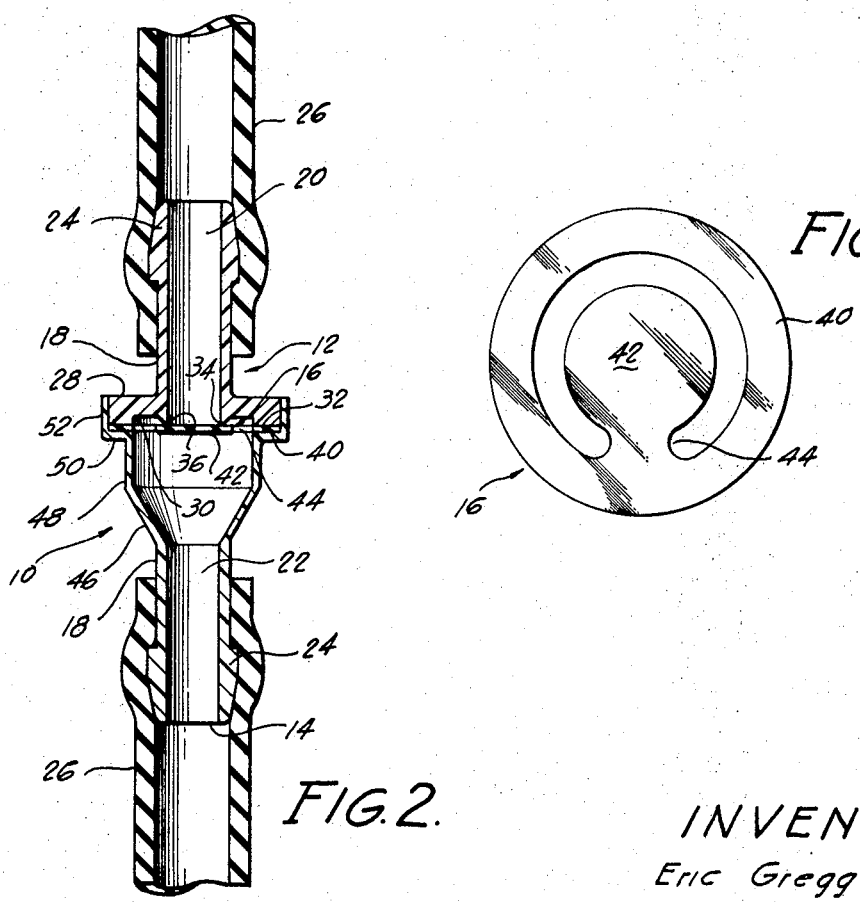
FIG. 2 is a sectional view of the coupling assembly shown in FIG. 1.
FIG. 3 is a front elevational view of the check valve shown in FIGS. 1 and 2.

In FIGS. 1 and 2 a check valve coupling assembly for a vehicle vacuum system is illustrated by the reference character 10. The coupling assembly comprises a male integrally formed plastic coupling element 12 axially aligned with a female integrally formed plastic coupling element 14 and a check valve 16 therebetween. Each coupling element 12 and 14 has a tubular shank 18 defining a respective passageway 20 and 22.

Each shank 18 terminates in a tapered shoulder 24 at one end with each taper extending radially inward toward the one end. The end of a respective hose 26 is expanded for receipt over the tapered shoulder 24 and necks down over the shank 18 where it thereafter is held engaged by the shoulder 24 and the contracting force of the expanded hose end.

The opposite or other end of coupling element 12 is provided with an integrally formed radially outwardly extending ring or disc 28 having an axially extending rim 30 terminating in a flat face 32. The passageway 20 extends centrally through disc 28 and is then defined by an axially extending conical wall 34 molded on element 12 and spaced radially inwardly of the rim 30. The taper on wall 34 extends radially inwardly to a sharp circular or knife edge 36 and the edge 36 projects axially the same distance as rim 30.

Check valve 16 comprises a ring or rim 40 of the same radial dimensions as face 32 and is adapted to seat against the flat surface 32 of rim 30. A central disc or flap 42 spaced radially inwardly from the rim 40 is connected to the rim 40 by a hinge 44 extending between a short portion of the outer periphery of the flap 42 and a short portion of the inner periphery of the rim 40. The flap 42 is radially somewhat larger than the circular edge 36 of the conical wall 34 and when pressed thereagainst, the edge 36 provides a high-pressure or sealing engagement with the flap 42.

The shank 18 of the coupling 14 is flared radially outwardly to describe a conical wall 46 merging with an annular wall 48 at the end opposite the shoulder 24 so that passageway 22 at that portion of coupling 12 has a diameter corresponding to the inner diameter of face 32. The annular wall 48 terminates in a cup shape having a back or flange wall 50 and a peripheral or axially extending rim wall 52 for nestingly receiving the disc 28 and rim 30 of coupling 12 with the rim 40 of valve 16 between the flat face 32 and the backwall 50 while the peripheral wall 52 engages the outer periphery of the disc 28.

With the check valve 16 sandwiched between couplings 12 and 14 and rim 52 engaged with disc 28, a predetermined axial pressure is applied to the disc 28 and backwall 50 for compressing the rim 40 of valve 38 therebetween. The engaged surfaces of disc 28 and rim 52 are then ultrasonically welded together. Thereafter when the external axial pressure is released, however, the rim 40 of valve 38 is held under the desired compression between face 32 and wall 50 to ensure against leakage.

In operation, the valve hinge 44 flexes toward coupling 14 in response to a pressure differential generated by air directed from passageway 20 in coupling 12 toward passageway 22 or a vacuum generated in passageway 22 to permit the passage of air in the direction of coupling 14. When a vacuum is drawn in passageway 20, however, the hinge 44 flexes in the opposite direction towards coupling 12 bringing flap 42 into engagement with circular edge 36 under pressure of the air in passageway 22. The edge 36 is a knife edge, which is formed without the usual machining problem, and provides sealing engagement with the valve flap 42 to prevent the passage of air from coupling 14 to coupling 12 and maintain the vacuum in coupling 12.

Another coupling and valve assembly 60 is illustrated in FIGS. 4 and 5. The coupling and valve assembly 50 comprises couplings 62 and 64 with couplings 62 and 64 being generally similar to couplings 12 and 14, respectively, with the exceptions to be described.

The couplings 62 and 64 are provided with a tubular shank 68 defining passageways 70 and 72, respectively. One end of each shank terminates in a tapered shoulder 74 for receiving a respective hose end. The other end of coupling 62 terminates in a disc or ring 76 and the corresponding end of coupling 64 terminates in a cup-shaped portion 78 having a backwall 80 and a peripheral or rim wall 82 for engagement over ring 76.

The coupling 62 is provided with an integrally formed branch tubular portion 84 so that the coupling may receive two hose connections. The branch portion 84 defines a passageway 86 communicating with passageway 70 defined by the main tubular portion of coupling 62 and extending into a common passageway 88 axially aligned with passageways 70 and 72 and defined by a conical surface 90 tapering radially outwardly in the axial direction of coupling 64.

The annular wall or ring 76 provided on the end of coupling 62 has its peripheral surface beveled at the juncture with the back and front faces of the ring as indicated at 92 and 94. The front face 96 of ring 76 adjacent coupling 64 is otherwise flat between its juncture with the periphery and the conical surface 90.

The cup 78 on coupling 64 is the same as the cup shape on coupling 16; however, the end of the peripheral wall 82 of the cup 78 is provided with a radially inwardly directed peripheral lip portion 98 for snap-fitted engagement with the beveled face 92 on ring 76.

A valve 100 having a rim 102, which is sandwiched between the front face 96 of ring 96 and the backwall 80 of the cup 82, serves to control flow between the coupling passageways 70, 86 and 72. The rim 102 is held under axial pressure between the face 96 and the wall 80 while cup wall 82 is welded to disc 76 to thereafter retain rim 102 under a desired compression. Rim 102 engages bevel face 94 to resist radially inwardly directed forces on the rim. It will be noted that with the exception of lip 98, couplings 14 and 64 are identical and may be used interchangeably. Spaced radially inwardly of the rim 102 is a flap or conical cup 104 defined by a conical peripheral wall 106 having a backwall 108 at one end and a peripheral flange 110 at the other end. The peripheral flange 110 engages the flat face 96 of the disc 76 adjacent the end of passageway 88 and the conical wall 108 seats in the correspondingly shaped and dimensioned passageway 88. The peripheral flange 110 is connected to rim 102 by three equiangular flexible straps 112 integrally formed on valve 100 and these hold the cup 104 in position while permitting the cup to move axially inwardly and outwardly relative to the general plane of disc 76 and face 96 for opening or closing the passageway.

When air pressure in either passageway 70 or 86 exceeds the pressure in passageway 72, the pressure against the wall 108 of cup 104 causes the cup to move axially in the direction of coupling 64 as the straps 112 flex. This allows air to pass into passageway 72 through coupling 64.

When a vacuum is drawn in passageways 70 and 86, air pressure in passageway 72 is exerted against wall 88 and drives the conical wall 106 of cup 56 axially into and against the conical passageway surface 90 with rim 110 seated against the front disc face 96. The radially outwardly directed air pressure in the cup 104 serves to seat the conical wall 106 against the passageway surface 90 and the axial pressure against wall 88 drives the conical wall 106 toward the more confined portion of the passageway to thereby seal against the passage of air.

In FIGS. 7 and 8 a quick connect coupling assembly is identified by the reference character 120. The quick connect assembly comprises a female coupling 122 having a tubular shank 124 defining a passageway 126 with a tapered shoulder 128 at one end of the shank 124 for receiving a hose connection. A radially enlarged tubular portion 130 is located on the end of shank 124 opposite shoulder 128. Tubular portion 130 defines a passageway 132 communicating with passageway 126 but of larger internal diameter than passageway 126 with a radial stop shoulder or wall 134 formed at the juncture of the two passageways.

The tubular portion 130 has a recess 135 formed adjacent the end of passageway 132 for receiving an O-ring 136. A tubular element 137 having an internal passageway corresponding in diameter to passageway 132 abuts against the end of portion 130 and ring 136. Element 137 is nestingly received within a peripheral rim 138 extending from the end of portion 130. Portion 130 and element 137 are ultrasonically welded together with ring 136 under appropriate pressure. A recess 140 in element 137 extends partially about the periphery of the passageway therein and this recess 140 is spaced a short distance from the recess 135 and intermediate the recess 135 and the end of element 137 opposite stop wall 134.

A radial passageway or slot 142 is formed in the wall of tubular element 137 and communicates the exterior surface of the tubular element 137 with the element passageway. A short axially extending recess 144 defined in part by radially extending ridges 146 is provided in the exterior surface of tubular element 137 with one end of the axially extending recess 144 in communication with the slot 142 intermediate the slot ends.

Extending radially through the slot 142 are a pair of wire tabs 148 and 150 integrally formed on respective ends of a spring clip 152 comprising a split wire or rod ring connector. A short axially extending segment 154 on tab 148 seats in the axially extending recess 144 and the ridges 146 are deformed as seen by broken line 156 to close the recess over segment 154. A bend is formed on the end of tab 150 and terminates in a radially inwardly directed leg 158 to facilitate grasping and avoid snags. The annular or ring portion of the clip 152 seats in the recess 140 opposite slot 142 for engaging in a recess 160 behind a shoulder 162 of a male coupling element 164.

The ring connector 152 is assembled to the coupling 120 by simple insertion of the ring through the slot 142 with the two tabs 148 and 150 being pressed towards each other to permit the ring 152 to pass through the slot 142. The axial segment 154 is seated in the axially extending recess 144 with the spring tension of the clip 152 expanding the ring. Thereafter the ridges 146 are deformed to prevent radial movement of segment 154 by closing the slot 144.

In the field the shouldered end of coupling 164 is simply inserted into the passageway of element 137. The shoulder 162 spreads the clip 152 into recess 140 until the recess 160, behind the shoulder 162, is axially aligned with the clip 152. The tension in the clip 152 then draws the clip into the recess 162 to prevent axial movement or retraction of the coupling 160. The shoulder 162 is then engaged with the internal periphery of the O-ring 136 to pressurize the ring 136 and seal the connection.

If retraction of coupling 164 is desired, the tab 150 may be moved toward the adjacent end of slot 142 while the axial segment 154 is held in recess 144. This permits the ring to expand and the coupling 162 to be retracted. It will be understood the tapered shoulder such as 24 or 74 at the ends of couplings such as 12, 14, 62 or 64 may also be used in place of couplings 162.

Figure 11:
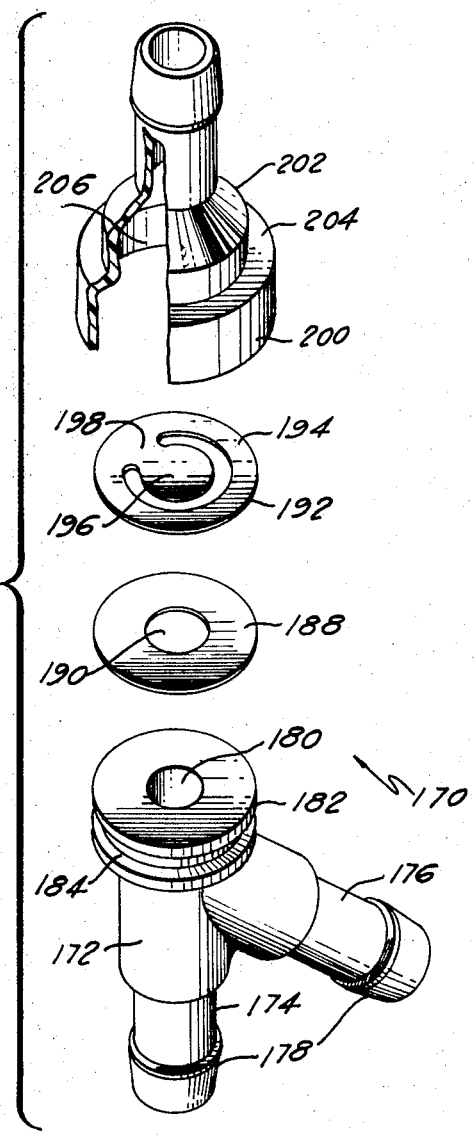
FIG. 11 is an exploded isometric view of a check valve assembly similar to that in FIGS. 1 and 2.
Figure 12:
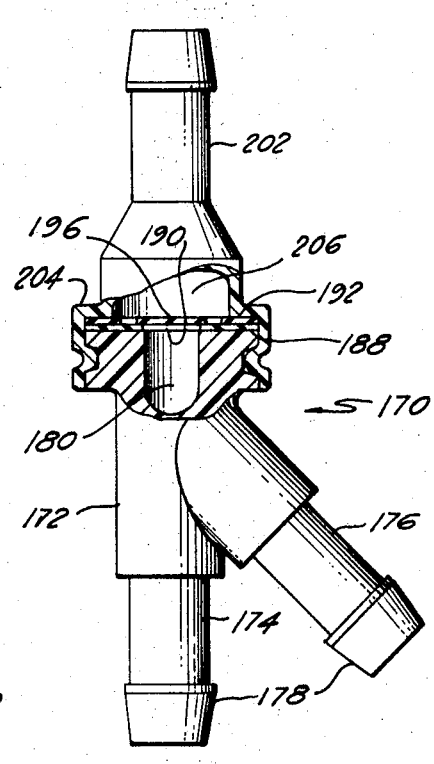
FIG. 12 is a view of the assembly shown in FIG. 11 in partial section.

In FIGS. 11 and 12 a check valve assembly 170 is illustrated. The assembly comprises a male coupling element 172 including branches 174 and 176 each having a shoulder 178 at one end for receiving a hose and defining a passageway in communication with a common passageway 180.

Passageway 180 is circumscribed by an enlarged ring or wall 182 having a peripheral recess 184 in the outer surface of the ring and intermediate the ring ends. A flat wall surface 186 is formed at the end of ring 182 for abutment with one side of a neoprene rubber ring 188 having an opening 190 therein conforming to the diameter of passageway 180. The other side of ring 188 butts against one side of a check valve 192 similar to valve 16.

Valve 192 includes a rim portion 194 and a flap 196 hinged to the rim at 198 with the flap being larger than opening 190 to cover the same. The rings 182 and 188 together with the valve 192 are received within a rim 200 of a female coupling element 202 similar to coupling element 14.

A backwall 204 formed on the end of rim 200 butts against the rim portion 194 of valve 192 and defines a portion of a passageway 206 in the coupling element 202 for communications with passageway 180. The ring 188 and the valve rim portion 194 are held under pressure between the wall 204 and ring 182 and the rim 200 is deformed into the recess 184 and welded to the ring 182.

In operation an excess of pressure in passageway 180 over that in passageway 206 such as created by a vacuum causes flap 196 to move toward passageway 206 and permit communication between the passageways. On the other hand an excess of pressure in passageway 206 over that in passageway 180 drives the flap 196 against ring 180, which can likewise deform somewhat in response to the pressure for sealing the passageway 206 from communication with passageway 180.

The foregoing constitutes a description of improved coupling assemblies whose inventive concepts are believed set forth in the accompanying claims.

We claim:

1. A quick connect coupling assembly for use with a coupling element defining a passageway and having a shoulder adjacent one end with said shoulder tapering radially inwardly towards said one end, the improvement comprising a tubular element defining a cylindrical passageway for receiving said shoulder and communicating with said coupling element passageway, an O-ring carried by said tubular element in said cylindrical passageway for engagement with said tapered shoulder to seal the surface of said shoulder against fluid passage, a radial slot in the wall of said tubular element communicating with a circumferentially extending recess formed in the internal wall of said tubular element, a spring clip comprising a slipring disposed solely in said cylindrical passage for expansion against the wall of said circumferentially extending recess with each end of said split ring having a tab extending radially through said slot, whereby said split ring is expanded in response to axial movement of said shoulder to enable passage of said shoulder and thereafter contracting behind said shoulder to prevent retraction of said coupling element, a reverse bend on one end of one of said tabs spaced from said one tab and extending radially inwardly to provide spaced grasping surfaces, an axially extending segment on the other one of said tabs with the outer surface of said tubular element having an axially extending recess communicating with said slot receiving said axially extending segment, and a deformed wall portion radially outwardly of said axial segment closing said axially extending recess intermediate the ends of said axially extending recess preventing radial outward movement of the axial segment.